United States Patent Office 3,287,321
Patented Nov. 22, 1966

3,287,321
FLUORENE POLYAMIDES
Samuel C. Temin, Pittsburgh, Pa., assignor to Koppers Company, Inc., a corporation of Delaware
No Drawing. Filed Aug. 16, 1960, Ser. No. 49,855
7 Claims. (Cl. 260—78)

This invention relates to high polymeric linear condensation-type polyamides derived from compounds containing a fluorene nucleus. In one specific aspect, it relates to novel polyamides characterized by intrinsic viscosity of at least 0.4 and a glass temperature of above 120° C. made by condensing a dicarboxylic acid and a bifunctional organic diamine, at least one of which contains a fluorene nucleus.

The common commercial polyamides are nylon 6 nylon 66 and nylon 610. Although these materials have achieved vast commercial success in the preparation of molded objects, when cast in large sections they are opaque and are thus unsuited in numerous applications where tough, transparent plastics are required.

Quite surprisingly I have discovered a new class of polyamides containing a fluorene nucleus which are transparent when cast in large sections. Moreover, my new polymers have higher glass temperatures than the commercially available nylon type polymers; thus, they have greater dimensional stability and resistance to flow under pressure or stress at temperatures well above the boiling point of water.

The clarity and dimensional stability of my new polymers makes them useful in a great variety of applications where conventional nylon polymers are unsuitable. For example, the new polymers in sheet form serve as shock-resistant windows in commercial and military aircraft. The fluorene polyamides are also useful in various structural applications wherein transparency coupled with shock-resistance is a particular requirement, thus they serve as shields or walls to protect spectators or sportscasters at sporting events and as transparent bottoms for boats in which the passengers can view coral and other marine formations. In the form of a transparent shield, the new polymers have specific utility in certain advertising devices. Since these polyamides can be obtained in crystal clear form, they can be used effectively in combination with various dyestuffs and pigments. The new polymers are also suitable for clear, transparent molded objects like lenses, prisms, and other optical devices.

It is therefore an object of the present invention to provide clear, transparent linear condensation-type polyamides of remarkable dimensional stability. It is a further object to provide polyamides of a heretofore unknown type which soften over a wide temperature range and do not crystallize when they are rolled or extruded.

In accordance with the present invention, I have discovered clear, transparent condensation-type linear polyamides characterized by an intrinsic viscosity of at least about 0.4 and a glass temperature of above 120° C. of (A) a bifunctional organic dicarboxylic acid compound selected from the group consisting of

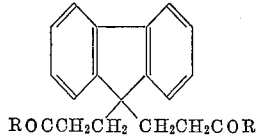

ROCCH₂CH₂ CH₂CH₂COR and ROC—Z—COR wherein R is a member selected from the group consisting of halo, hydroxy and lower alkoxy and Z is a member selected from the group consisting of phenylene and normal alkylene chains having from 6–10 carbon atoms; and (B) a bifunctional organic diamine selected from the group consisting of

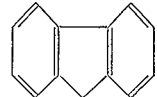

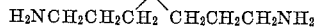

H₂NCH₂CH₂CH₂ CH₂CH₂CH₂NH₂ and H₂N—CH₂—Z'—CH₂—NH₂ wherein Z' is a member selected from the group consisting of phenylene and normal alkylene chains having from 4–8 carbon atoms; at least one of the members selected from (A) and (B) being a compound containing a fluorene nucleus.

The fluorene compounds useful in the invention include 9,9-bis(2'-carboxyethyl)fluorene, its halides, and its lower alkyl esters and 9,9-bis(3'-aminopropyl)fluorene. The preparation of these compounds is described in U.S. Patents 2,320,029 and 2,339,218 issued to Herman A. Bruson. Although the Bruson patents suggest that these substances are useful in the preparation of synthetic resins, there is no teaching therein of the particular resins of the invention, which are characterized by remarkable transparency and dimensional stability. It is also surprising in view of the teachings of Bruson that the remarkable toughness of the new polyamides is achieved only when the molecular weight is high enough, i.e. if the (η) is over about 0.4. This is quite unlike conventional nylons where lower molecular weight materials are not so brittle.

Useful dicarboxylic acid compounds other than 9,9-bis(2'-carboxyethyl)fluorene and its equivalents, include adipic acid, pimelic acid, sebacic acid, phthalic acid, isophthalic acid and the like. Suitable amines, other than that containing the fluorene nucleus, include hexamethylenediamine, octamethylenediamine, decamethylenediamine, and the ortho-, meta-, and para- position isomers of α,α'-xylenediamine.

The preparation of the novel polyamides of the invention can be accomplished by well-known methods involving the condensation of bifunctional dicarboxylic acids and bifunctional diamines. Illustrative methods are those described in Carothers Patents 2,130,523 and 2,130,948.

Conveniently, the polyamides of the invention are prepared via the salts made by contacting approximately one mole of dicarboxylic acid compound with one mole of diamine in the presence of a suitable inert organic solvent in which the reactants are soluble and the product formed is insoluble. Useful solvents include the lower alkanols, particularly methanol or isopropanol.

The salt formed as a result of the reaction between substantially stoichiometric quantities of dicarboxylic acid compound and diamine is separated from the solvent by filtration and is thereafter polymerized in an inert atmosphere, e.g. under a blanket of nitrogen, carbon dioxide or hydrogen, at a temperature of 200–300° C. Polymerization is effected generally at atmospheric pressure, although it is sometimes advantageous to conduct the reaction under superatmospheric pressure to prevent the escape of volatile reactants. The final stage of the polymerization reaction can be conducted at atmospheric pressure in an inert atmosphere or, alternatively, under a vacuum. Polymerization is continued until a polymer having the desired molecular weight as determined by intrinsic or relative viscosity is obtained. Conventional polyamide polymerization catalysts can be used in order to reduce the polymerization time. Polymerization can also be effected in an inert solvent such as cresol, xylenol, or the like. A suitable reaction time to obtain a polymer of the desired viscosity depends to a large extent on the nature of the particular reactants selected and on the size of the batch. When adequate surface generation is provided, a polymerization time of 2–4 hours is generally satisfactory. If the polymerization is completed under vacuum, a 1–2 hour final stage is sufficient to give a polymer of the desired properties.

The remarkable properties of the new polyamides of the invention are perhaps best appreciated by comparing the significant physical properties of the new polyamide as determined by standard tests described in the examples with ASTM standards for various common molding materials, which are given in ASTM 1958 Book of Standards, Part 9 and 1959 Supplement. Such a comparison, with respect to clarity, glass transition temperature and Izod notched impact strength, is given below in Table I. For the data shown in the table, notched impact is measured according to ASTM Standard Testing Procedure D 256–56 and clarity is determined by physical observation. The glass transition, or second order transition, temperature is measured by a needle point penetrometer with a 1500 g. loading, generally according to the method of Edgar and Ellery (J. Chem. Soc., 1952, 2633). The values obtained by this method are quite close to those obtained according to ASTM test D 648–56 and reported as "deflection temperatures at 264 p.s.i. fiber stress." For amorphous polymers it is also a measure of the softening point or heat distortion temperature. For the polymers listed in Table I, other than those of this invention, the highest value of the two has been chosen.

TABLE I

| Polymer | Clarity | Deflection or Glass Temp. (° C.) | Notched Impact, ft.lb./in. |
| --- | --- | --- | --- |
| Cellulose Acetate, hard | Opaque | 60–80 | 0.4–0.8 |
| Nylon FM-3001 | do | 50 | 1.0 |
| Rigid Vinyl Chloride | Clear | 52–4 | 0.3–0.5 |
| Polystyrene | do | 90–5 | 0.3 |
| Vinylidene Chloride | do | 55 | |
| Styrene Acrylonitrile | do | 85–91 | 0.4 |
| Cast Allyl | do | 60–80 | 0.3 |
| Cast Methacrylate, gen. purp | do | 70–95 | 0.3 |
| F6 Polyamide, Example II | do | 120–5 | 0.7 |
| 6F Polyamide, Example IV | do | 122–4 | 0.7 |
| FF Polyamide, Example VI | do | 165 | 0.6 |

It is seen form the data of Table I that the new polyamides show an unexpected combination of toughness and clarity not to be found in either the conventional nylon type polymers or in the commercially available clear plastics. A notched impact strength of about 0.6 foot-pounds per inch is considered excellent for molding purposes. All of the new polyamides compare favorably with the conventional nylon type polymers in this respect and, surprisingly, the new polymers have double the impact strength of the commercially available clear plastics. Moreover, the data shows convincingly that the new polyamides are markedly superior to conventional nylon with respect to the glass transition temperature (and thus serviceability at higher temperatures), since the glass transition temperature of the new polymers is generally 80–125° C. higher than that of the conventional nylon polymers. The same degree of superiority is shown by the new polymers over the available clear molding resins. Thus the particular combination of clarity, impact strength of 0.6 ft.-lb./in. of notch or over, and softening point of over 120° C. is not possessed by heretofore known resins.

My invention is further illustrated by the following examples:

EXAMPLE I

*Preparation of F6 salt [salt of 9,9-bis(3'-aminopropyl)-fluorene and adipic acid]*

To a solution of 146 parts of adipic acid in 1500 parts of isopropanol at 45° C., there was added, with stirring, a solution of 280 parts of 9,9-bis(3'-aminopropyl)fluorene and adipic acid in 200 parts of isopropanol and 20 parts water. Addition took one hour and the temperature was maintained at 50–55° C. The mixture was stirred an additional one hour and then allowed to cool to room temperature. The white, crystalline solid was separated by filtration and washed with isopropanol. The salt was then dissolved in 500 parts of distilled water and 5 parts activated charcoal added. The mixture was heated two hours, filtered, and the filtrate added to 1000 parts of isopropanol. The colorless solution was cooled to 5° C. and 335 parts of F6 salt obtained. The salt had a melting point of 208–8.5° C. and a 10% solution thereof had a pH of 7.3.

EXAMPLE II

*Polymerization of F6 salt*

Into a stainless steel vessel was placed 290 parts of F6 salt prepared as described in Example I. The vessel was equipped with a spirally twisted anchor-type stainless steel stirrer, a thermometer well, nitrogen inlet, and exit port. The vessel was heated by immersion in a Woods metal bath originally heated to 270° C. A nitrogen blanket and stirring were maintained throughout the polymerization.

There was a vigorous evolution of water and the salt melted down to a viscous liquid. Within 30 minutes most of the water had been evolved and the temperature of the viscous melt was 245° C. The melt was then heated under a vacuum of 10 mm. for 30 minutes. The temperature of the melt reached 255° C. The vacuum was released and the melt heated an additional 30 minutes at atmospheric pressure to obtain a bubble-free polymer. The melt was allowed to cool under nitrogen and a tough, clear, transparent, plug of polymer was obtained. The plug could not be broken using a 10 lb. hammer. Solution viscosity was determined using a 0.5% solution in 90:10 phenol-ethanol at 35° C. in a No. 100 Ostwald-Fenske viscometer. The $\eta_{sp/c}$ was 0.836. The glass transition temperature, Tg, was determined using a penetrometer similar to that described by Edgar and Ellery [J. Chem. Soc., 2633 (1952)]. The value of Tg was 120–5° C. In contrast therewith, a sample of commercial nylon 66 was found (using the same device) to have a glass temperature, Tg, of just above room temperature. A molded specimen bar gave an Izod notched impact value of 0.68 ft.-lb. per inch for the novel polymer. The moisture regain at 50% relative humidity and 70° C. was 1.4%.

EXAMPLE III

*Preparation of 6F salt [hexamethylenediammonium salt of 9,9-bis(2'-carboxyethyl)fluorene]*

A solution of 620.6 parts of 9,9-bis(2'-carboxyethyl)-fluorene in 20,000 parts of isopropanol was dissolved by heating and stirring. To this hot (70° C.) solution was added, with stirring, a solution of 350 parts of a 78% aqueous solution of hexamethylene diamine in 2500 parts of isopropanol. The mixture was stirred for about 15 minutes after addition of diamine was complete, while maintaining the temperature at about 70° C., and then allowed to cool. The white, crystalline salt that precipitated was separated by filtration and washed twice with 1000 parts of isopropanol. The salt, which analyzed correctly for the desired structure, melted at 220–2° C., a 10% solution in water had a pH of 7.2.

EXAMPLE IV

*Polymerization of 6F salt*

Using the same equipment described in Example II, 300 parts of nylon 6F salt was heated, under constant stirring and a nitrogen atmosphere, for one hour at 250–260° C., then for 30 minutes at 270° C. at 10 mm. of pressure, and finally at 270° C. for 30 minutes at atmospheric pressure. The polymer, $\eta_{sp/c}$=.436 (determined as described in Example II), was a tough, transparent solid. A molded bar gave an Izod notched impact value of 0.70 ft.-lb. per inch. Tg, determined as described in Example II, was 122–4° C.

EXAMPLE V

*Preparation of FF salt*

To a hot (75° C.) solution of 274.4 parts of 9,9-bis(3'-aminopropyl)fluorine in 500 parts of isopropanol was added, with stirring, 310.3 parts of 9,9-bis(2'-carboxyethyl)fluorene in 2000 parts of isopropanol. The mixture was stirred an additional 30 minutes after addition was complete and then allowed to cool. The precipitated salt was separated by filtration, washed with isopropanol, and dried. The FF salt, 540 g., melted at 212.5–214° C. A 10% solution in water had a pH of 7.2.

EXAMPLE VI

*Polymerization of FF salt*

Using the apparatus described in Example IV, FF salt was heated for 30 minutes at 270° C. at atmospheric pressure, then 30 minutes at 10 mm. pressure and 270° C., and finally at atmospheric pressures and 270° C. for 30 minutes. An almost colorless, transparent plug of polymer was obtained. Even on cooling to −80° C. the plug could not be broken with repeated blows of a 10 lb. sledge hammer, $\eta_{sp/c}$ was 0.586. This polymer had the surprisingly high value of 165° C. for Tg. At 50% R.H. and 70° F., the moisture regain was 1.5%.

EXAMPLE VII

*Preparation and polymerization of Nylon F10*

To 500 parts isopropanol was added 56.08 parts of 9,9-bis(3'-aminopropyl)fluorene. This solution was added to a solution of 40.45 parts of sebacic acid in 2000 parts of isopropanol at 60° C. On standing and cooling the solution deposited 80 parts of white, crystalline salt. After drying the melting point was 215–19° C. The salt was placed in a cylinder fitted with a nitrogen inlet and an outlet port. The cylinder was heated at 260° C. for 35 minutes. At this point, the contents were a colorless, practically immobile melt. The melt was heated at 260° C. for 30 minutes at 1 mm. pressure and then 15 minutes at atmospheric pressure. The white polymer obtained was extremely tough and transparent. It did not melt on a heated metal block at 300° C. although it softened at 200–210° C.

EXAMPLE VIII

*Polymerization of F6 salt*

Using the polymerization cylinder described in Example VII, a sample of F6 salt was heated at 260–265° C. for 35 minutes at atmospheric presure, then at the same temperature but at 10 mm. pressure for 30 minutes and then at the same temperature but 1 mm. pressure for 70 minutes. The resulting clear, extremely tough polyamide had an $\eta_{sp/c}$ value (determined as described above) of 1.52. This example and Example VII illustrate the effect of high vacuum in attaining high molecular weight polyamides from the F type nylon salts.

The word "parts" as used in the foregoing examples refers to parts by weight.

I claim:

1. A clear, transparent condensation-type linear polyamide, characterized by an intrinsic viscosity of at least 0.4 in a solution of 90 parts phenol and 10 parts ethanol at 35° C. and a glass transition temperature above 120° C., of (A) a bifunctional organic dicarboxylic acid compound selected from the group consisting of

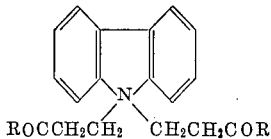

ROCCH₂CH₂   CH₂CH₂COR and ROC—Z—COR, wherein R is a member selected from the group consisting of halogen, hydroxy and lower alkoxy, and Z is a member selected from the group consisting of phenylene and normal alkylene chains having from 6–10 carbon atoms; and (B) an organic diamine selected from the group consisting of

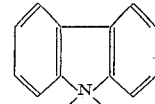
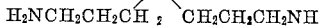

H₂NCH₂CH₂CH₂   CH₂CH₂CH₂NH and H₂N—CH₂—Z'—CH₂—NH₂, wherein Z' is a member selected from the group consisting of phenylene and normal alkylene chains having from 4–8 carbon atoms; at least one of the members selected from (A) and (B) being a compound containing a fluorine nucleus.

2. A clear transparent condensation-type linear polyamide, characterized by an intrinsic viscosity of at least 0.4 in a solution of 90 parts phenol and 10 parts ethanol at 35° C. and a glass transition temperature above 120° C., of 9,9-bis(3'-aminopropyl)fluorene and adipic acid in substantially equimolar amounts.

3. A clear transparent condensation-type linear polyamide, characterized by an intrinsic viscosity of at least 0.4 in a solution of 90 parts phenol and 10 parts ethanol at 35° C. and a glass transition temperature above 120° C., of 9,9-bis(3'-aminopropyl)fluorene and sebacic acid in substantially equimolar amounts.

4. A clear transparent condensation-type linear polyamide characterized by an intrinsic viscosity of at least 0.4 in a solution of 90 parts phenol and 10 parts ethanol at 35° C. and a glass transition temperature above 120° C., of 9,9-bis(3'-aminopropyl)fluorene and 9,9-bis(2'-carboxyethyl)fluorene in substantially equimolar amounts.

5. A clear transparent condensation-type linear polyamide, characterized by an intrinsic viscosity of at least 0.4 in a solution of 90 parts phenol and 10 parts ethanol at 35° C. and a glass transition temperature above 120° C., of 9,9-bis(3'-aminopropyl)fluorene and isophthalic acid in substantially equimolar amounts.

6. A clear transparent condensation-type linear polyamide characterized by an intrinsic viscosity of at least 0.4 in a solution of 90 parts phenol and 10 parts ethanol at 35° C. and a glass transition temperature above 120° C., of hexamethylenediamine and 9,9-bis(2'-carboxyethyl)fluorene in substantially equimolar amounts.

7. A linear, transparent, moldable polycarbonamide of a dicarboxylic acid of the formula:

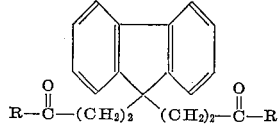

$$R-\overset{O}{\underset{\|}{C}}-(CH_2)_2 \quad (CH_2)_2-\overset{O}{\underset{\|}{C}}-R$$

wherein R is selected from the group consisting of halogen, hydroxy and lower alkoxy; and a diamine of the formula: H₂N—Z—NH₂ wherein Z is selected from the group consisting of divalent alkylene hydrocarbon radicals of 6 to 10 carbon atoms and phenylene radical.

References Cited by the Examiner

UNITED STATES PATENTS

| 2,320,029 | 5/1943 | Bruson | 260—578 |
|---|---|---|---|
| 2,339,218 | 1/1944 | Bruson | 260—515 |
| 2,731,447 | 1/1956 | Gresham et al. | 260—78 |
| 2,880,230 | 3/1959 | Edwards et al. | 260—78 |
| 2,907,754 | 10/1959 | Howlett et al. | 260—78 |

FOREIGN PATENTS

| 570,858 | 7/1945 | Great Britain. |
|---|---|---|

SAMUEL H. BLECH, *Primary Examiner.*

MILTON STERMAN, *Examiner.*

HAROLD N. BURSTEIN, LEON J. BERCOVITZ, WILLIAM H. SHORT, H. D. ANDERSON,
*Assistant Examiners.*